United States Patent
Wacker

(10) Patent No.: US 8,683,237 B2
(45) Date of Patent: Mar. 25, 2014

(54) SYSTEM AND METHOD FOR RESETTING POWER OF OPTICAL NETWORK TERMINAL WHEN A NUMBER OF PREDEFINED HOOK FLASH SIGNALS GENERATED BY A TELECOMMUNICATION DEVICE DETECTED AT THE CUSTOMER'S PREMISES

(75) Inventor: Christopher T. Wacker, Stillwater, OK (US)

(73) Assignee: ESPI LLC, Clay Center, KS (US)

( * ) Notice: Subject to any disclaimer, the term of this patent is extended or adjusted under 35 U.S.C. 154(b) by 27 days.

(21) Appl. No.: 13/194,008

(22) Filed: Jul. 29, 2011

(65) Prior Publication Data

US 2013/0031379 A1    Jan. 31, 2013

(51) Int. Cl.
*G06F 1/00* (2006.01)

(52) U.S. Cl.
USPC ........................................................ 713/300

(58) Field of Classification Search
None
See application file for complete search history.

(56) References Cited

U.S. PATENT DOCUMENTS

| | | | |
|---|---|---|---|
| 4,516,168 A * | 5/1985 | Hicks | 348/730 |
| 6,243,449 B1 * | 6/2001 | Margulis et al. | 379/112.04 |
| 7,729,612 B2 | 6/2010 | Jiang et al. | |
| 7,751,711 B2 | 7/2010 | Wynman | |
| 7,774,633 B1 | 8/2010 | Harrenstien et al. | |
| 2005/0163237 A1 * | 7/2005 | Katanaya | 375/260 |
| 2008/0240367 A1 | 10/2008 | Wynman | |
| 2009/0092075 A1 * | 4/2009 | Corson et al. | 370/328 |
| 2009/0228696 A1 | 9/2009 | McKelvey et al. | |
| 2010/0042820 A1 * | 2/2010 | Clemm et al. | 713/2 |
| 2011/0066840 A1 * | 3/2011 | Bandholz et al. | 713/100 |

* cited by examiner

Primary Examiner — Thomas Lee
Assistant Examiner — Zhipeng Wang
(74) Attorney, Agent, or Firm — Polsinelli PC

(57) ABSTRACT

The disclosure relates to a system and method to allow an end user to remotely reset or reboot an optical network terminal (ONT) and/or residential gateway that has become unresponsive or otherwise needs to be reset. In various aspects, the end user may initiate a sequence of hook flash signals from a telecommunication device that causes an ONT control system to power cycle the ONT.

31 Claims, 3 Drawing Sheets

… (1)

SYSTEM AND METHOD FOR RESETTING POWER OF OPTICAL NETWORK TERMINAL WHEN A NUMBER OF PREDEFINED HOOK FLASH SIGNALS GENERATED BY A TELECOMMUNICATION DEVICE DETECTED AT THE CUSTOMER'S PREMISES

FIELD OF THE INVENTION

The present application relates to optical network terminals in telecommunications systems. In particular, the present application relates to systems and methods for enabling end user to reset an optical network terminal (ONT) and/or residential gateway.

BACKGROUND OF THE INVENTION

An ONT is a terminal of a fiber optic line in a telecommunication network that demultiplexes a signal transmitted through the fiber optic line into its component parts (e.g. voice telephone, television, data, and Internet). The ONT typically derives its power from the electrical supply at the end user's premises; therefore, many ONTs include a battery backup to maintain service in the event of a power outage.

ONTs often function as computing devices and therefore are subject to suspend operation (e.g., lock up, freeze) or otherwise become unresponsive. In addition, there are times where the ONT must be restarted to accept a software or firmware update. The ONT is often secured and mounted in an outdoor location at the customer's premises that is not easily accessible by the customer. As a result, when the ONT is in an unresponsive state, the fiber optic network company or service provider is often required to send service personnel to the end users premises to manually restart or reboot the unresponsive ONT.

SUMMARY OF THE INVENTION

The present application relates to systems and methods for allowing an end user to remotely reset an optical network terminal. In one aspect, a system for resetting an optical network terminal includes a processor and memory to store threshold data. The threshold data identifies a hook flash sequence to occur within a time period.

The system also includes an optical network terminal control application executed by the processor to detect one or more hook flash signals generated by a telecommunication device and determine if the detected one or more hook flash signals is the hook flash sequence. The telecommunication device is, for example, a telephone or a fax machine. The optical network terminal control application also interrupts power supplied to the optical network terminal when the number of hook flash signals detected is equal to or greater than the first number of number of hook flash signals and reestablishes power to the optical network terminal.

In another aspect, the optical network terminal control application for resetting an optical network terminal is encoded on a computer-readable medium. The control application includes modules executable by a processing device that has memory to store threshold data. The threshold data includes a hook flash sequence identifying at least one hook flash signal to occur within a time period in order to reset an optical network terminal. The modules of the optical network terminal control application include a detection module to detect one or more hook flash signals generated by a telecommunication device and a counting module to count a number of the one or more hook flash signals detected by the detection module within the time period and determine if the detected one or more hook flash signals is the same as the hook flash sequence. The modules also include a reset module to interrupt power supplied to the optical network terminal when the counting module determines that the detected one or more hook flash signals is equal to the hook flash sequence and reestablish power to the optical network terminal.

In yet another aspect, a method for resetting an optical network terminal includes detecting one or more hook flash signals generated by the telecommunication device and counting a number of the one or more hook flash signals that are detected within a time period. The method also includes interrupting power supplied to the optical network terminal when the number of the one or more hook flash signals counted within the time period is equal to or greater than a threshold number of hook flash signals and reestablishing power to the optical network terminal.

DETAILED DESCRIPTION OF THE INVENTION

The systems and methods of the present application allow an end user or a customer of a fiber optic telecommunication service to remotely reset an optical network terminal (ONT) located at or near the customer's premises with their telecommunication device. The system resets the ONT in response to a hook flash series or sequence generated by the customer using a telecommunication device, such as a telephone or a fax machine. Other telecommunication devices that can generate a hook flash signal may also be used. As used herein, a hook flash signal generally refers to an off-hook/on-hook cycle having a threshold duration range. In one aspect, the hook flash signal has a minimum duration of approximately 10 milliseconds and a maximum duration of approximately 1000 milliseconds. The duration of the hook flash signal typically omits incidental and/or accidental off-hook/on-hook conditions from being counted as a hook flash signal. Similarly, lengthy periods between an off-hook/off-hook condition, such as during a telephone call will also be ignored. The apparatus is designed to recognize several hook flash signal within a period of time to briefly remove power from the ONT or issue reset instructions to reset the ONT.

Figure 1:
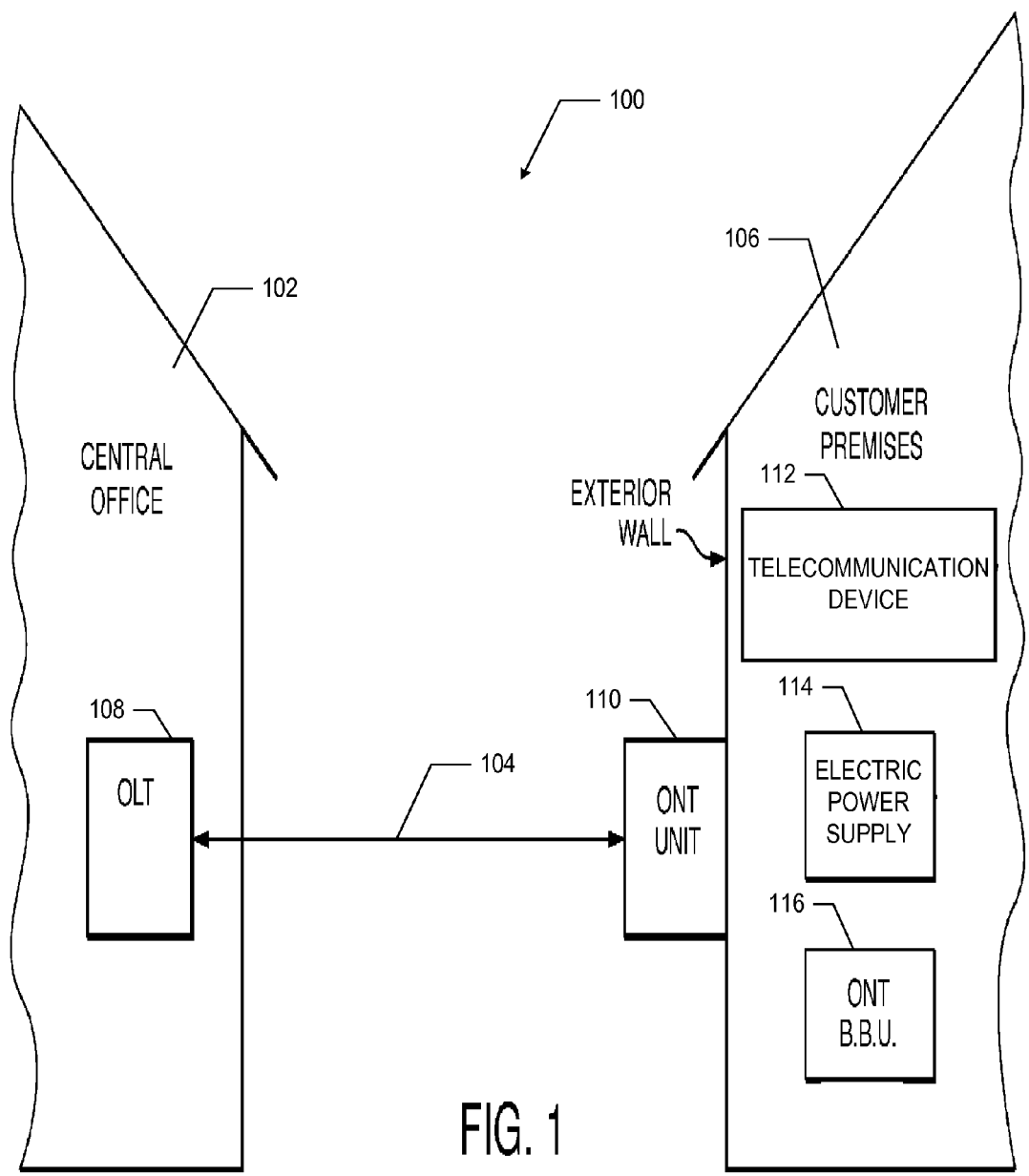
FIG. 1 is a block diagram depicting an exemplary fiber optic network system according to one aspect.

FIG. 1 depicts an exemplary architecture of a fiber optic network system 100 according to one aspect of the invention. The fiber optic network system 100 is sometimes referred to as FTTx to generalize the various architecture configurations of fiber optic network systems. For example, some of the more common architecture configurations include Fiber-to-the-node (FTTN), Fiber-to-the-cabinet (FTTC), Fiber-to-the-building or Fiber-to-the-basement (FTTB), Fiber-to-the-home (FTTH), and Fiber-to-the premises (FTTP). In this example, the fiber optic network system 100 has an FTTP configuration, where a central office 102 for a telecommunication company is communicatively connected with a customer's premises 106 via a fiber optic cable 104. The customer's premises 106 may be, for example a residential home, a place of business, or any other location where fiber optic-based communication is desired.

In one aspect, the central office 102 houses a optical line terminal (OLT) 108 and other equipment typically used in fiber optic communications, such as switches, routers, and servers (not shown). The OLT 108 is a device which functions as the telecommunication company's endpoint for a passive optical network. By way of example, and not limitation, the OLT 108 performs the conversion between the electrical signals used by the telecommunication company and the fiber optic signals used by the fiber optic network and coordinates the multiplexing between the conversion devices located at the customer's premises 106, such as an optical network terminal (ONT) unit 110. Although the system is described herein in connection with a passive optical network, it is contemplated the system can be implemented with an active optical network, such as an Ethernet type network.

In one aspect, the ONT unit 110 is a terminal on the fiber optic cable 104 to demultiplex signals transmitted from the OLT 108 into its component parts (e.g. voice telephone, television, and Internet), and provide power to the customer's telecommunication device 112. By way of example and not limitation, the customer's telecommunication device 112 may be a telephone, facsimile devices, a computing device, a modem, or any other equipment that can generate a hook-flash signal and communicate over the fiber optic cable 104.

In another aspect, the ONT unit 110 includes a number of ports to facilitate various modes of communication. For example, the ONT unit 110 may include Voice over Internet Protocol (VoIP) ports to allow voice communications and multimedia sessions over Internet Protocol (IP) networks. Therefore the customer's telecommunication device 112 may also be a VoIP phone or a VoIP adaptor in communication with a router or modem.

Typically, the ONT unit 110 derives its power from the electrical power supply 114 for the customer's premises 106. The electrical power supply 114 is provided by an electrical utility company, which is often a distinct entity from the fiber optic network service provider. As such, the ONT unit 110 typically includes a battery backup unit (BBU) 116 in order to maintain service in the event of a power outage. Thus, the BBU 116 allows a customer to continue using their telecommunication device 112 if there is a power outage.

Figure 2:
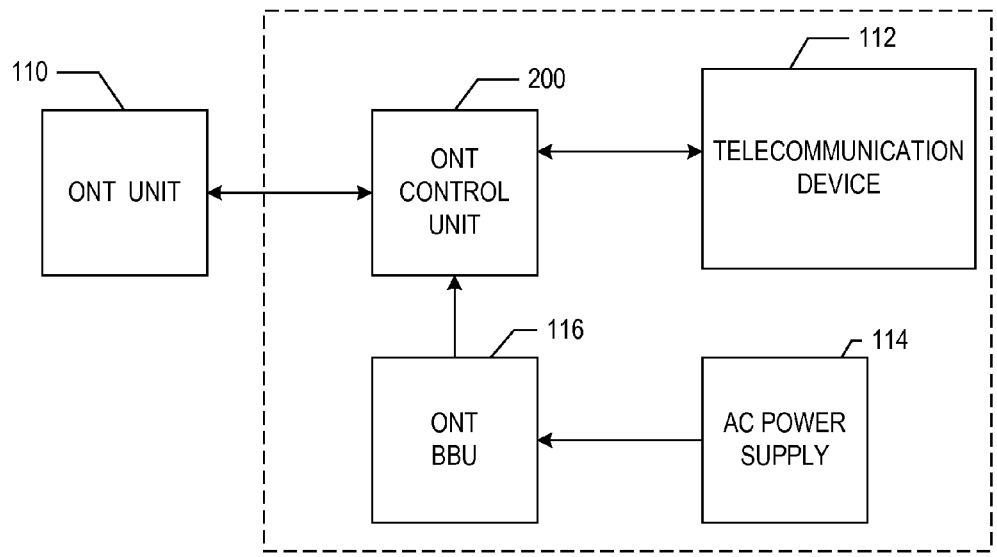
FIG. 2 is a block diagram depicting an exemplary arrangement of the components of the fiber optic network system at the customer's premises according to one aspect.

FIG. 2 is a block diagram depicting an exemplary arrangement of the components of the fiber optic network system 100 at the customer's premises 106 according to one aspect. As shown, the customer premises 106 may include an ONT control unit 200 to interact with the ONT unit 110. In one aspect, the ONT control unit 200 is a computing device that is positioned between the ONT unit 110 and the customer's telecommunication device 112, the electrical power supply 114, and the BBU 116. In another aspect, the ONT control unit 200 may be incorporated into the ONT unit 110. The ONT control unit 200 controls the operation of resetting the ONT unit 110. The ONT control unit 200 detects a hook flash signal by detecting a short across a wire pair at the telecommunication device 112. For example, the ONT control unit 200 detects a short at a wire pair of the telecommunication device 112 when the device is in an off-hook condition. Therefore, the ONT control unit 200 detects a hook flash signal by detecting a sustained short across the wire pair that falls within the threshold duration range.

Figure 3:
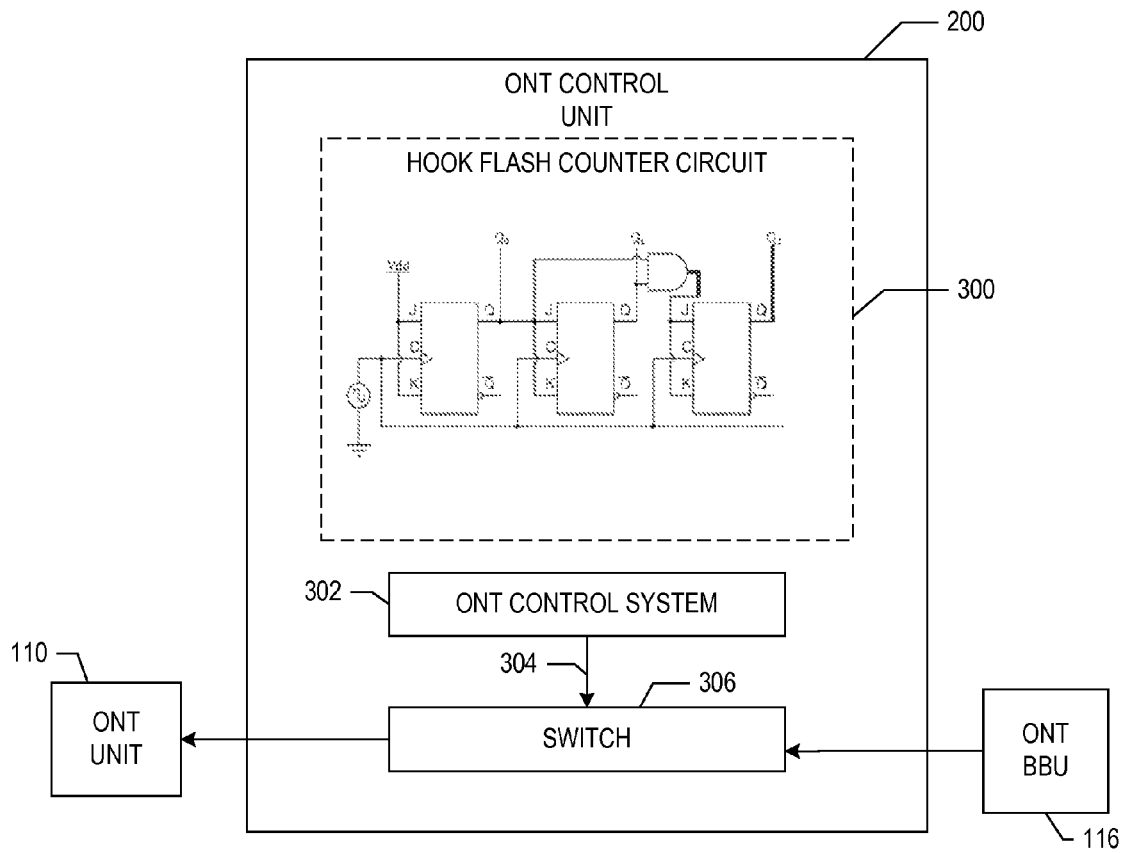
FIG. 3 is a block diagram depicting an embodiment of the ONT control unit according to one aspect.

FIG. 3 is a block diagram depicting an embodiment of the ONT control unit 200 according to one aspect. The ONT control unit 200 includes a hook flash counter circuit 300 to count the hook flash signals received from the customer's telecommunication device 112. The ONT control unit 200 also includes an ONT control system 302 to control various aspects of the ONT unit 110, such as the power being supplied to the ONT unit.

The hook flash counting circuit 300 may be any circuit or signal detection apparatus that can receive and count a signal. By way of example and not limitation, the hook flash counting circuit 300 may be a "flip-flop" circuit, as shown. In this example, the hook flash counting circuit 300 counts the number of hook flash signals received within a particular period and assumes a particular state based upon the number of signals received. In one aspect, each hook flash signal has a finite duration; therefore, the number of hook flash signals received at the hook flash counting circuit 300 within a time period can be determined.

By way of example, and not limitation, the duration (pulse width) of each hook flash signal is greater than approximately ten milliseconds, but less than approximately one second. Therefore, a sequence comprising a selected number of hook flash signals may be completed within a particular time. For example, a series of ten hook flash signals may be generated within a fifteen second time period. Other sequences and time periods may also be used. In one aspect, a sequence of hook signals that vary in duration may be detected, regardless of the time period. In another aspect, the time period may be long or shorter. In a preferred aspect, the ONT control unit 200 will interrupt the power being supplied to the ONT unit 110 when a sequence of seven hook flash signals are counted by the hook flash counting circuit in ten seconds or less. In this aspect, the duration of each hook flash signal need not be identical. In various other aspects, the ONT control unit 200 could be modified to respond to other hook flash signal sequences, including sequences where the hook flash signals vary in duration.

The ONT control system 302 is a system associated with the ONT control unit 200 to detect and count hook flash signals. The ONT control system 302 also controls the power being supplied to the ONT unit 110. For example, the ONT control system 302 generates an output signal 304 that is used to open a switch 306 to interrupt the power supplied to the ONT unit 110.

Figure 4:
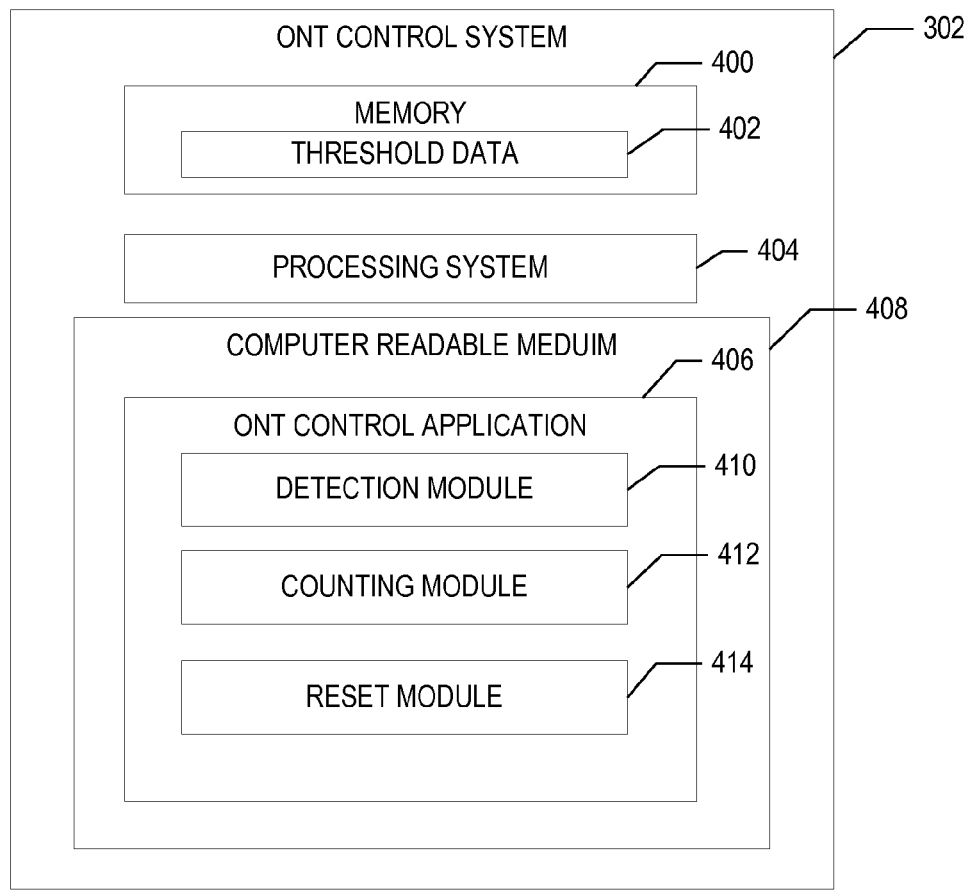
FIG. 4 depicts one embodiment of the ONT control system according to one aspect.

FIG. 4 depicts one embodiment of the ONT control system 302 according to one aspect. The ONT control system 302 includes memory 400 and a processing system 404 having one or more processors or other processing devices. The memory 400 stores threshold data 402 that defines the required number hook flash signals, the duration of the hook flash signals and the time period during which the hook flash signal sequence must be received in order to initiate the power cycling of the ONT unit 110. The processing system 404 executes an ONT control application 406 to detect and count hook flash signals in conjunction with the hook flash counting circuit 300.

According to one aspect, the ONT control system 302 includes a computer readable medium (CRM) 408 configured with the ONT control application 406. The ONT control application 406 includes instructions or modules that are executable by the processing system 404 to detect and count hook flash signals and to generate the output signal 304 that opens the switch 306 in response to one or more received hook flash signals that exceed the threshold indicated by the threshold data 402.

The CRM 408 may include volatile media, nonvolatile media, removable media, non-removable media, and/or another available medium that can be accessed by the ONT control system 302. By way of example and not limitation, the CRM 408 comprises computer storage media and communication media. Computer storage media includes memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

A detection module 410 detects one or more hook flash signals from the customer's telecommunication device 112. The detection module 410 also determines if the hook flash signal meets a determined duration or sequence threshold as identified in the threshold data 402.

A counting module 412 counts the number of hook flash signals that meet the threshold as determined by the detection module 410. The counting module 410 also determines if the required sequence of hook flash signals is received a within a predetermined time period.

The reset module 414 temporarily disconnects the BBU 116 from the ONT unit 110 for a short time period, thereby causing the power level to the ONT unit 110 to drop below an operational threshold and the ONT unit 110 to reset once power is restored. In one aspect, the reset module 414 controls a switch that disconnects the power from the BBU 116, such that the ONT unit 110 does not receive any power. In another aspect, the reset module 414 controls a potentiometer, to decrease the power supplied to the ONT unit 110, such that the power falls below an operational level, thereby effectively cutting power to the ONT unit. Once the power has been removed from the ONT unit 110 for a period of time sufficient to power down the ONT unit, the reset module 414 automatically reestablishes the flow of power thereby causing the ONT unit to reboot or reset.

In another aspect, the ONT control system 302 is incorporated into and located with in the ONT unit 110. In this aspect, the reset module 414 issues software reset instructions or commands executable by a processor to reset the ONT unit 110 and restart or reboot any software or other code executing on the ONT 110, without reducing power to the ONT unit below the operational level.

Figure 5:
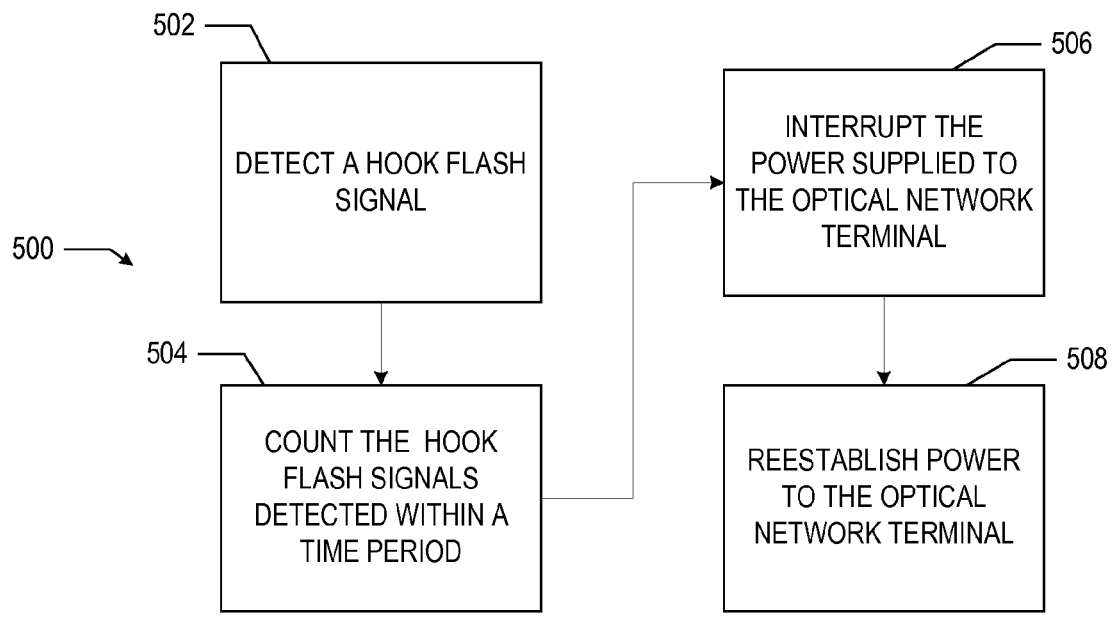
FIG. 5 is a flowchart depicting a method for remotely resetting an ONT according to one aspect.

FIG. 5 is a flowchart depicting a method 500 for remotely resetting an ONT according to one aspect. At 502, the one or more hook flash signals generated by a telecommunication device are detected. For example, the hook flash signals may be detected by the optical control unit 200. The optical control unit 200 counts the number of hook flash signals received from the telecommunication device 112 with a pre-determined period of time at 504. In one aspect, optical control unit 200 determines the number of hook flash signals received based upon the state of the flip-flop counting circuit 300.

Once the number of hook flash signals have been counted and it is determined that the required number of signals were counted within the pre-determined time period, the optical control unit 200 interrupts the power being supplied to the ONT unit 110, at 506. In one aspect, the power is gradually decreased until the voltage and/or the amperage supplied to the ONT unit 110 is below the operating level necessary to power the ONT unit. At 508, the power is reestablished to the ONT unit 110, thereby effectively power cycling the ONT unit to remedy an unresponsive state or to affect a desired restart of the unit.

In another aspect, once the number of hook flash signals have been counted and it is determined that the required number of signals were counted within the pre-determined time period, the ONT control system 302 issues software reset instructions or commands that are executable by a processor to reset the ONT unit 110 and restart or reboot any software or other code executing on the ONT unit 110. The software reset instructions may be issued instead of power cycling the ONT unit 110. Alternately, the software reset instructions may be issued and executed prior to or after power cycling the ONT unit 110.

By way of example and not limitation, the method 500 may be performed to accept a change dictated by a fiber optic service provider. In this example, the end user or customer must generate a hook flash signal 10 times within 15 seconds using their telephone. The optical control unit 200 monitors the phone line for the off-hook and on-hook cycles that define the hook flash signal. Once the optical control unit 200 detects an off-hook/on-hook cycle lasting longer than 10 milliseconds, but not more than 1000 milliseconds, the counter is increased by one. In one aspect, the state of the flip-flop circuit 300 is changed by one value.

In this example, if the number of qualifying off-hook/on-hook cycles equals 10 in less than 15 seconds, then power is briefly removed from the ONT unit 110 or, alternately, reset instructions are issued to restart any applications the ONT unit. This allows the ONT to be reset by the customer. Conversely, if the customer does not complete the required sequence within the second time period, power is not removed from the ONT unit 110.

It will be appreciated that the device and method of the present invention are capable of being incorporated in the form of a variety of embodiments, only a few of which have been illustrated and described above. The invention may be embodied in other specific forms without departing from its spirit or essential characteristics. The described embodiments are to be considered in all respects only as illustrative and not restrictive and the scope of the invention is, therefore indicated by the appended claims rather than by the foregoing description. All changes which come within the meaning and range of equivalency of the claims are to be embraced within their scope.

What is claimed is:

1. A system for resetting an optical network terminal at a customer's premises, the system comprising:
    a processor;
    a memory to store threshold data, the threshold data identifying a hook flash sequence and a corresponding time period for the hook flash sequence; and
    an optical network terminal control application executed by the processor to:
        detect one or more hook flash signals generated by a telecommunication device at the customer's premises;
        determine if the detected one or more hook flash signals is at least equal to a number of threshold hook flash signals defined by the hook flash sequence;
        interrupt power supplied to the optical network terminal when the number of hook flash signals detected is equal to or greater than the number of threshold hook flash signals; and
        reestablish power to the optical network terminal after a predetermined time interval stored in the memory.

2. The system of claim 1 wherein the hook flash sequence identifies two or more threshold hook flash signals, and wherein each of the two or more threshold hook flash signals have a substantially same duration.

3. The system of claim 2 wherein the corresponding time period for the two or more hook flash signals exceeds 150 milliseconds.

4. The system of claim 1 wherein the hook flash sequence identifies two or more threshold hook flash signals of different duration.

5. The system of claim 4 wherein the duration for at least one of the two or more threshold hook flash signals exceeds 150 milliseconds.

6. The system of claim 1 wherein the hook flash sequence comprises between six to ten hook flash signals.

7. The system of claim 1 wherein the corresponding time period is between ten and fifteen seconds.

8. The system of claim 1 wherein determining if the detected one or more hook flash signals is the hook flash sequence further comprises counting the one or more hook flash signals generated by the telecommunication device at a flip-flop counter circuit.

9. The system of claim 1 wherein the optical network terminal control application determines if the detected one or more hook flash signals is the hook flash sequence by counting the number of hook flash signals generated at the telecommunication device within the time period.

10. The system of claim 1 wherein the optical network terminal control application interrupts the power supplied to the optical network terminal by decreasing a voltage applied to the optical network terminal such that the voltage falls below an operational level.

11. The system of claim 1, wherein the optical network terminal control application issues instructions executable by the processor to restart software executing on the optical network terminal.

12. A non-transitory computer-readable medium encoded with an optical network terminal control application comprising modules executable by a processing device having memory storing threshold data comprising a hook flash sequence identifying at least one threshold hook flash signal and a corresponding time period for the hook flash sequence, the optical network terminal control application configured to reset the optical network terminal located at a customer's premises, the application comprising:
    a detection module to detect one or more hook flash signals generated by a telecommunication device;
    a counting module to count a number of the one or more hook flash signals detected by the detection module within the time period and determine if the detected one or more hook flash signals is equal to the at least one threshold hook flash signal identified by the hook flash sequence; and
    a reset module to:
        interrupt power supplied to the optical network terminal at the customer's premises when the counting module determines that the detected one or more hook flash signals is equal to the at least one threshold hook flash signal; and
        reestablish power to the optical network terminal after a predetermined time period.

13. The non-transitory computer-readable medium of claim 12 wherein the hook flash sequence identifies two or more threshold hook flash signals of equal duration.

14. The non-transitory computer-readable medium of claim 13 wherein the duration for the two or more threshold hook flash signals exceeds 150 milliseconds.

15. The non-transitory computer-readable medium of claim 12 wherein the hook flash sequence identifies two or more threshold hook flash signals of different duration.

16. The non-transitory computer-readable medium of claim 15 wherein the duration for at least one of the two or more threshold hook flash signals exceeds 150 milliseconds.

17. The non-transitory computer-readable medium of claim 12 wherein the hook flash sequence comprises six to ten hook flash signals.

18. The non-transitory computer-readable medium of claim 12 wherein the time period is between ten and fifteen seconds.

19. The non-transitory computer-readable medium of claim 12 wherein the optical network terminal control application determines if the detected one or more hook flash signals is equal to the at least one threshold hook flash signal identified by the hook flash sequence by counting the number of hook flash signals generated at the telecommunication device within the corresponding time period.

20. The non-transitory computer-readable medium of claim 12 wherein the optical network terminal control application interrupts the power supplied to the optical network terminal by decreasing a voltage applied to the optical network terminal such that the voltage falls below an operational level.

21. The non-transitory computer-readable medium of claim 12 wherein the reset module issues instructions to restart software executing on a processor of the optical network terminal.

22. A method for resetting an optical network terminal located at a customer's premises, the method comprising:
    generating one or more hook flash signals with a telecommunications device at the customer's premises;
    detecting one or more hook flash signals generated by the telecommunication device;
    counting a number of the one or more hook flash signals that are detected within a time period;
    interrupting power supplied to the optical network terminal via a switch when the number of the one or more hook flash signals counted within the time period is equal to or greater than a threshold number of hook flash signals retrieved from a memory; and
    reestablishing power to the optical network terminal via the switch after a predetermined time period.

23. The method of claim 22 wherein counting the number of the one or more hook flash signals further comprises:
    receiving the one or more hook flash signals generated by the telecommunication device at a flip-flop counter circuit;
    identifying a state of the flip-flop circuit; and
    determining the number of the one or more hook flash signals based on the state of the flip-flop circuit.

24. The method of claim 22 wherein the threshold number of hook flash signals comprises two or more hook flash signals of equal duration.

25. The method of claim 22 wherein the duration for the two or more hook flash signals exceeds 150 milliseconds.

26. The method of claim 22 wherein the threshold number of hook flash signals comprises two or more hook flash signals of different duration.

27. The method of claim 26 wherein the duration for at least one of the two or more hook flash signals exceeds 150 milliseconds.

28. The method of claim 22 wherein the threshold number of hook flash signals comprises 6 to 10 hook flash signals.

29. The method of claim 22 wherein the time period is between ten and fifteen seconds.

30. The method of claim 22 wherein interrupting power supplied to the optical network terminal further comprises:
    decreasing a voltage applied to the optical network terminal such that the voltage falls below an operational level; and maintaining the decreased voltage until the optical network terminal powers down.

31. The method of claim 22 further comprising:
generating instructions executable by the processing device to restart software executing on a processor of the optical network terminal.

\* \* \* \* \*